(12) United States Patent
Goebel

(10) Patent No.: US 8,541,145 B2
(45) Date of Patent: Sep. 24, 2013

(54) TAPERED ANODE HEADER INSERT FOR STARTUP HYDROGEN DISTRIBUTION

(75) Inventor: Steven G. Goebel, Victor, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 425 days.

(21) Appl. No.: 12/887,792

(22) Filed: Sep. 22, 2010

(65) Prior Publication Data

US 2012/0070761 A1  Mar. 22, 2012

(51) Int. Cl.
*H01M 8/04* (2006.01)
*H01M 8/24* (2006.01)

(52) U.S. Cl.
USPC ............ 429/458; 429/456; 429/512; 429/514

(58) Field of Classification Search
USPC .................. 429/410, 512–516, 210, 456–462
See application file for complete search history.

(56) References Cited

U.S. PATENT DOCUMENTS

| 5,958,613 | A  | * | 9/1999  | Hamada et al. ............... 429/410 |
| 6,416,899 | B1 |   | 7/2002  | Wariishi et al. |
| 6,924,056 | B2 |   | 8/2005  | Whiton et al. |
| 2005/0118487 | A1 |   | 6/2005  | Whiton et al. |
| 2005/0129999 | A1 |   | 6/2005  | Geschwindt et al. |
| 2006/0280995 | A1 | * | 12/2006 | Whiton et al. ................... 429/38 |
| 2009/0123808 | A1 | * | 5/2009  | An et al. ......................... 429/34 |

* cited by examiner

*Primary Examiner* — Basia Ridley
*Assistant Examiner* — James Erwin
(74) *Attorney, Agent, or Firm* — Fraser Clemens Martin & Miller LLC; J. Douglas Miller

(57) ABSTRACT

A fluid distribution insert adapted to be received within an inlet header of a fuel cell assembly is disclosed. The fluid distribution insert includes a wedge section having a first end and a second end. The wedge section forms a fluid flow path between a surface forming the inlet header and the wedge section, wherein the fluid flow path receives a fluid therein and delivers the fluid to a plurality of fuel cells of the fuel cell assembly. The wedge section minimizes a cross-sectional area of the fluid flow path adjacent the second end of the wedge section to maintain a substantially constant fluid velocity along a length of the inlet header.

16 Claims, 3 Drawing Sheets

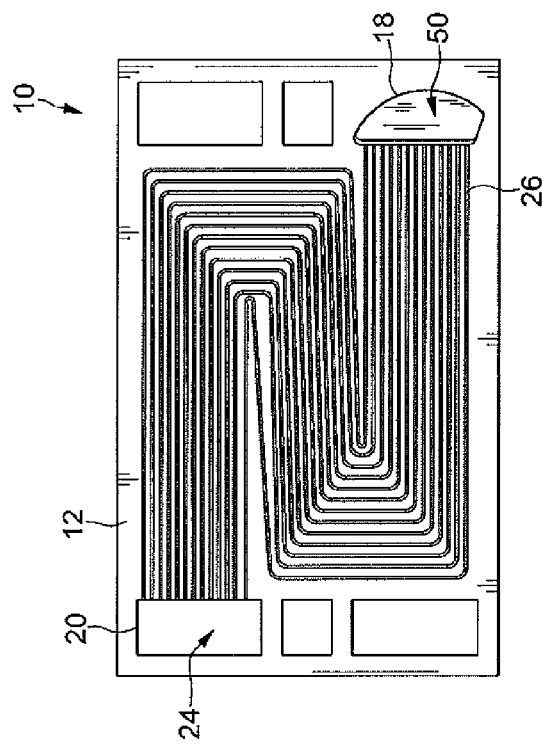
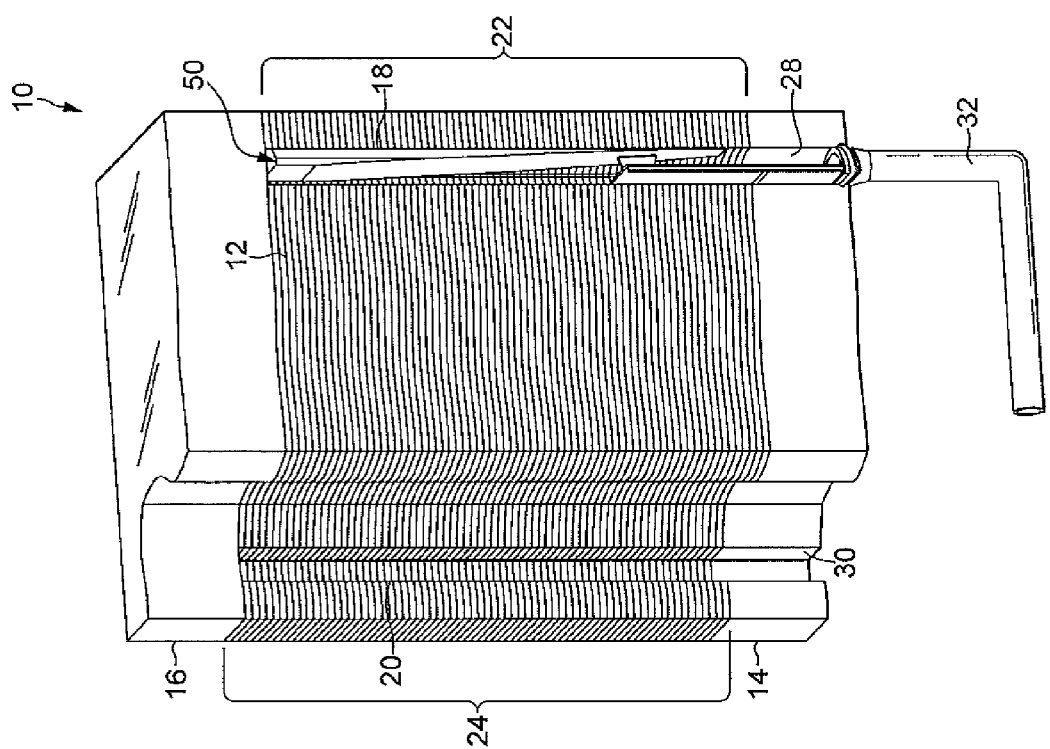

TAPERED ANODE HEADER INSERT FOR STARTUP HYDROGEN DISTRIBUTION

FIELD OF THE INVENTION

The present disclosure relates to a fuel cell stack and more particularly to a fuel cell stack including an insert disposed in an inlet header thereof to facilitate a substantially simultaneous flow of fluid to fuel cells of the fuel cell stack.

BACKGROUND OF THE INVENTION

Fuel cell power systems convert a fuel and an oxidant (reactants) to electricity. One type of fuel cell power system employs a proton exchange membrane (PEM) to catalytically facilitate reaction of the fuel (such as hydrogen) and the oxidant (such as air or oxygen) to generate electricity. Water is a byproduct of the electrochemical reaction. The PEM is a solid polymer electrolyte that facilitates transfer of protons from an anode electrode to a cathode electrode in each individual fuel cell of a stack of fuel cells normally deployed in the fuel cell power system.

In the typical fuel cell assembly, the individual fuel cells have fuel cell plates with channels, through which various reactants and cooling fluids flow. Fuel cell plates may be unipolar, for example. A bipolar plate may be formed by combining unipolar plates. The oxidant is supplied to the cathode electrode from a cathode inlet header and the fuel is supplied to the anode electrode from an anode inlet header. Movement of the water byproduct from the channels to an outlet header is typically caused by the flow of the reactants through the fuel cell assembly. Boundary layer shear forces and a pressure of the reactant aid in transporting the liquid water through the channels until the water exits the fuel cell through the outlet header.

A membrane-electrode-assembly (MEA) is disposed between successive plates to facilitate the electrochemical reaction. The MEA includes the anode electrode, the cathode electrode, and an electrolyte membrane disposed therebetween. Porous diffusion media (DM) are positioned on both sides of the MEA to facilitate a delivery of reactants for the electrochemical fuel cell reaction.

When initiating the electrochemical fuel cell reaction in the fuel cell stack, it is typically desired to provide the hydrogen fuel in such a manner to cause the individual fuel cells to receive the hydrogen in the active areas thereof at substantially the same time. However, the inlet header typically fills with hydrogen in such a manner that causes fuel cells closest to a hydrogen inlet of the inlet header to be the first fuel cells to receive the hydrogen and the fuel cells that are farthest from the hydrogen inlet of the inlet header to be the last fuel cells to receive the hydrogen.

As the hydrogen flows into the active areas of the fuel cell plates, a localized voltage rise may be measured. When an electrical load is applied to the fuel cell stack, the voltage rise generates a current that is driven through the remaining fuel cell plates of the fuel cell stack. Fuel cells of the fuel cell stack which do not have a sufficient amount of hydrogen to support the current may experience a reversed voltage, thereby resulting in electrode carbon corrosion. Delaying the start of the electrochemical fuel cell reaction until such time as all the fuel cells are supplied with hydrogen typically results in an undesired emission of hydrogen through the exhaust header of the fuel cell stack and carbon corrosion to the cathode electrode of the cells which received hydrogen first without the benefit of an electrical load to suppress the voltage of these cells.

Various techniques have been employed to simultaneously provide hydrogen to each of the fuel cells at the start-up of the electrochemical fuel cell reaction in the fuel cell stack. One such technique includes providing an inlet header purge valve such as disclosed in U.S. Patent Application Publication No. 2005/0129999. The purge valve enables the inlet header to be flushed with hydrogen just prior to initiating the electrochemical fuel cell reaction. The purge valve increases a cost of the fuel cell system and introduces additional moving parts to the fuel cell system.

An alternative technique has employed a plurality of fluid passages to form an external header that supplies the hydrogen to distributed locations within the inlet header of the fuel cell stack. U.S. Pat. No. 6,924,056 and U.S. Patent Application Publication Nos. 2005/0118487 and 2006/0280995 generally illustrate such a technique. The external header may be difficult to seal against the fuel cell stack, and increases a cost and overall size of the fuel cell stack.

It would be desirable to produce a cost effective inlet header insert for a fuel cell stack that facilitates a substantially simultaneous delivery of a hydrogen fuel to each fuel cell in the fuel cell stack at the initiation of an electrochemical fuel cell reaction.

SUMMARY OF THE INVENTION

Compatible and attuned with the present invention, a cost effective inlet header insert for a fuel cell stack that facilitates a substantially simultaneous delivery of a hydrogen fuel to each fuel cell in the fuel cell stack at the initiation of an electrochemical fuel cell reaction, has been surprisingly discovered.

In one embodiment, a fluid distribution insert for a fuel cell assembly comprises a wedge section having a first end and a second end, the wedge section received within an inlet header of the fuel cell assembly to form a fluid flow path between a surface forming the inlet header and the wedge section, wherein the fluid flow path is adapted to receive a fluid therein and deliver the fluid to a plurality of fuel cells of the fuel cell assembly, wherein the wedge section minimizes a cross-sectional area of the fluid flow path adjacent the second end of the wedge section to maintain a substantially constant fluid velocity along a length of the fluid flow path.

In another embodiment, a fluid distribution insert for a fuel cell assembly comprises a wedge section having a first end and a second end, the wedge section received within an inlet header of the fuel cell assembly to form a fluid flow path between a surface forming the inlet header and the wedge section, wherein the fluid flow path is adapted to receive a fluid therein and deliver the fluid to a plurality of fuel cells of the fuel cell assembly; and a baffle section having a first end and a second end, the baffle section received within the inlet header of the fuel cell assembly, wherein the second end of the baffle section and the first end of the wedge section cooperate to form a fluid passageway therebetween, wherein the wedge section minimizes a cross-sectional area of the fluid flow path adjacent the second end of the wedge section to maintain a substantially constant fluid velocity along a length of the inlet header.

In another embodiment, a fuel cell assembly comprises a first end plate and a spaced apart second end plate; a plurality of fuel cells disposed between the first end plate and the second end plate; an inlet header in fluid communication with the fuel cells for supplying a reactant gas to the fuel cells; and a fluid distribution insert received within the inlet header of the fuel cell assembly, the fluid distribution insert comprising a wedge section having a first end and a second end, the wedge section received within the inlet header of the fuel cell assembly to form a fluid flow path between a surface forming the inlet header and the wedge section, wherein the fluid flow path is adapted to receive a fluid therein and deliver the fluid to the plurality of fuel cells of the fuel cell assembly; and a baffle section having a first end and a second end, the baffle section received within the inlet header of the fuel cell assembly, wherein the second end of the baffle section is spaced from the first end of the wedge section to form a fluid passageway therebetween, wherein the wedge section minimizes a cross-sectional area of the fluid flow path adjacent the second end of the wedge section to maintain a substantially constant fluid velocity along a length of the inlet header and decrease the startup hydrogen arrival time to the furthest cells near the second end of the wedge section to have a hydrogen arrival time more similar to that for the cells near the first end of the wedge section.

DRAWINGS

The above, as well as other advantages of the present invention will become readily apparent to those skilled in the art from the following detailed description, particularly when considered in the light of the drawings described hereafter.

FIG. 1 is a fragmentary perspective view of a fuel cell stack according to an embodiment of the invention showing a distribution insert disposed within an inlet header of the fuel cell;

FIG. 2 is a top plan view of the fuel cell stack illustrated in FIG. 1 with an end plate removed;

DETAILED DESCRIPTION OF THE INVENTION

Figure 3:
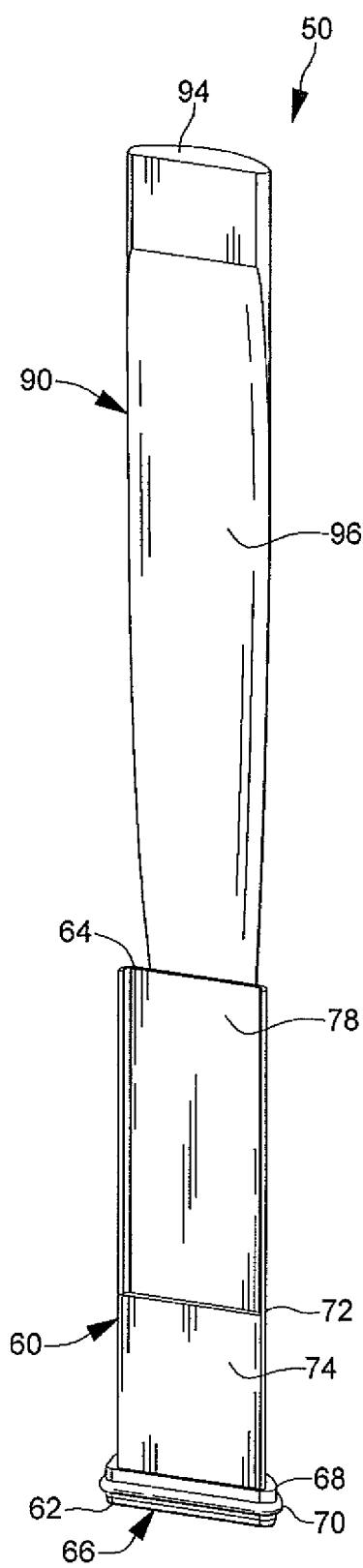
FIG. 3 is an enlarged perspective view of the distribution insert illustrated in FIG. 1

The following description is merely exemplary in nature and is not intended to limit the present disclosure, application, or uses. It should also be understood that throughout the drawings, corresponding reference numerals indicate like or corresponding parts and features.

FIGS. 1-2 show a fuel cell assembly 10 according to an embodiment of the present disclosure. The fuel cell assembly 10 includes a plurality of stacked fuel cells 12 disposed between end plates 14, 16. Each of the fuel cells 12 includes an inlet port 18 and an outlet port 20. The fuel cells 12 are stacked with the inlet port 18 and the outlet port 20 of each fuel cell 12 substantially aligned with the respective inlet port 18 and the outlet port 20 of an adjacent fuel cell 12. Collectively, the inlet ports 18 of each of the fuel cells 12 form an inlet header 22 and the outlet ports 20 of each of the fuel cells 12 form an outlet header 24. The inlet header 22 is adapted to provide a flow of a reactant such as a fuel (e.g. hydrogen) from a source of fuel (not shown) or an oxidant (e.g. air or oxygen) from a source of oxidant (not shown), for example, to a plurality of inlet channels 26 of the fuel cells 12. In the illustrated embodiment, the inlet header 22 is an anode inlet header providing a flow of a fuel to the fuel cells 12.

The end plate 14 includes an inlet 28 formed therein in fluid communication with the inlet header 22 and an outlet 30 formed therein in fluid communication with the outlet header 24. The inlet 28 and the outlet 30 are substantially aligned with the respective inlet header 22 and the outlet header 24. The end plate 16 may include a fluid passage formed therethrough in fluid communication with the inlet header 22. It should be understood that a pressure relief valve, purge valve, and the like, for example, can be provided in the fluid passage to selectively allow a flow of a fluid therethrough.

Figure 4:
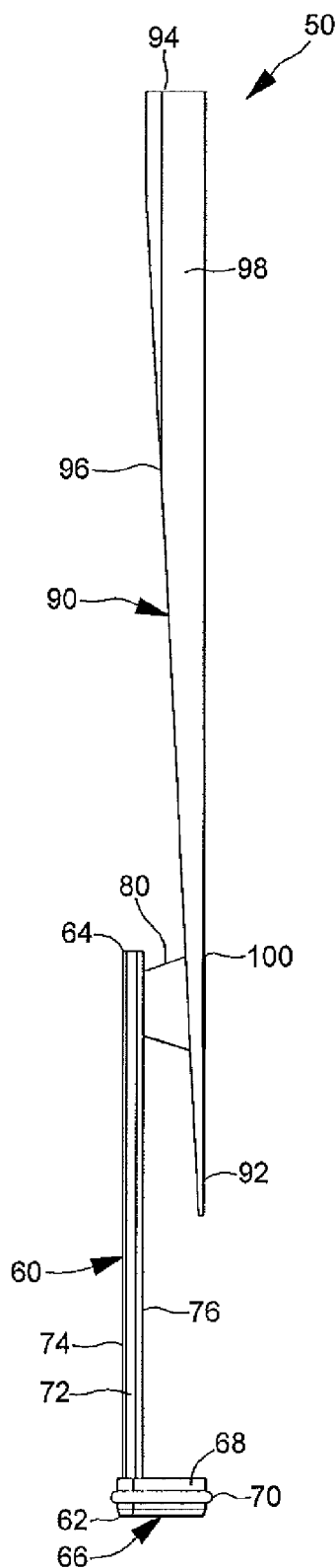
FIG. 4 is an enlarged side elevational view of the distribution insert illustrated in FIGS. 1 and 3.
Figure 5:
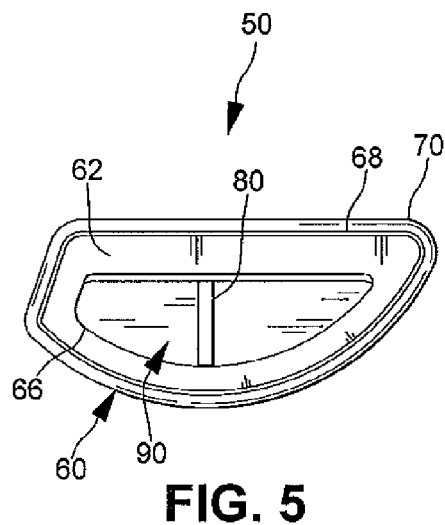
FIG. 5 is an enlarged bottom plan view of the distribution insert illustrated in FIGS. 1, 3, and 4.

A fluid distribution insert 50, more clearly shown in FIGS. 3-5, is disposed within the inlet header 22. As shown, the distribution insert 50 extends from the inlet 28 of the end plate 14 to the end plate 16. The distribution insert 50 is a generally elongate insert having a baffle section 60 and a wedge section 90. The baffle section 60 includes a first end 62 and a second end 64, wherein the first end 62 is disposed adjacent the inlet 28 of the end plate 14 and the second end 64 is coupled to the wedge section 90. As shown in FIG. 1, a supply conduit 32 provides fluid communication from the source of the fuel to an inlet 66 formed at the first end 62 of the baffle section 60. The inlet 66 provides a fluid flow path from the supply conduit 32 through the baffle section 60 into the inlet header 22 of the fuel cell assembly 10.

A coupling member 68 is formed at the first end 62 of the baffle section 60 to facilitate coupling the baffle section 60 to the supply conduit 32 and/or the inlet 28 of the end plate 14. A sealing member 70 such as an O-ring, for example, can be provided to facilitate forming a substantially fluid tight seal between the coupling member 68 and the supply conduit 32 and the inlet 28 of the end plate 14. It should be understood that other coupling members such as a threaded coupling, a snap-fit coupling, and the like, for example, can be provided to facilitate coupling the baffle section 60 to the supply conduit 32 and/or the inlet 28 of the end plate 14.

A wall 72 extends outwardly from the coupling member 68 and terminates at the second end 64 of the baffle section 60. The wall 72 includes a first side 74 and a spaced apart second side 76. The first side 74 abuts a surface forming the inlet 28 of the end plate 14. A flow channel 78 is formed on the first side 74 of the wall 72. The flow channel 78 extends from the second end 64 of the baffle section 60 toward the first end 62 of the baffle section 60 and terminates adjacent the fuel cell 12 abutting the end plate 14. The flow channel 78 forms a fluid flow path between the surface forming the inlet header 22 and the baffle section 60. A protuberance 80 is formed on the second side 76 of the wall 72 adjacent the second end 64 of the baffle section 60. The protuberance 80 extends outwardly from the second side 76 of the wall 72 and couples together the baffle section 60 and the wedge section 90 of the distribution insert 50. The protuberance 80 causes the second end 64 of the baffle section 60 to be spaced from the wedge section 90 to form a fluid passageway therebetween.

The wedge section 90 includes a first end 92 and a second end 94. As more clearly shown in FIG. 4, the wedge section 90 is tapered, wherein a thickness of the wedge section 90 generally increases from the first end 92 to the second end 94. The wedge section 90 includes a first side 96 and a spaced apart second side 98. The first side 96 faces the inlet channels 26 of the fuel cells 12 of the fuel cell assembly 10. The wedge section 90 forms a fluid flow path between the surface forming the inlet header 22 adjacent the inlet channels 26 and the first side 96 of the wedge section 90, wherein a cross sectional area of the flow path is generally reduced along a length of the wedge section 90 from the first end 92 to the second end 94 thereof. An opening 100 is formed in the wedge section 90 adjacent the first end thereof. The opening 100 receives the protuberance 80 of the baffle section 60 to couple the baffle section 60 with the wedge section 90. An adhesive, a weld, a snap fit, and the like, for example, can be used to secure the protuberance 80 to the baffle section 60 and the wedge section 90. It should be understood that the protuberance 80 can be formed in the wedge section 90 and the opening 100 can be formed in the baffle section 60. It should also be understood that the wedge section 90 can be used without the baffle section 60, wherein the wedge section 90 is received in the inlet header 22 to form a tapered inlet header. It should be understood that spacers can be formed on the first side 96 of the wedge section 90 to facilitate maintaining the first side 96 spaced from the surface forming the inlet header 22 of the fuel cell assembly 10.

The distribution insert 50 may be formed by injection molding a plastic material, for example, wherein the baffle section 60 and the wedge section 90 are formed individually and then coupled together as illustrated in FIG. 4. It should be understood that the distribution insert 50 can be formed employing other processes and materials. It should also be understood that the distribution insert 50 can be formed as a unitary structure. Additionally, at least a portion of the distribution insert 50 can be formed from or include a wicking material adapted to collect water entrained in the fuel. The wicking material can be a hydrophilic material, a hydrophobic material, and any other suitable material adapted to collect water entrained in the reactant. It should be understood that the cross-sectional shape of the distribution insert 50 can be substantially circular, oval, triangular, square, rectangular, or a combination of curved and substantially planar surfaces, for example, wherein the cross-sectional shape of the distribution insert 50 is adapted to be received within the inlet header 22 of the fuel cell assembly 10.

In use, the distribution insert 50 is inserted within the inlet header 22 to position the second end 94 of the wedge section 90 adjacent the end plate 16. It should be understood that the end plate 16 or the wedge section 90 can include a member adapted to couple the distribution insert 50 to the end plate 16. The coupling member 68 of the baffle section is caused to sealingly engage a surface forming the inlet 28 and the supply conduit 32 to provide a flow of fuel from the source through the supply conduit 32 and the inlet 66 of the baffle section 60 into the inlet header 22. The coupling member 68 facilitates securing the distribution insert 50 within the inlet header 22. The distribution insert 50 is oriented in respect of the inlet header 22 to position the flow channel 78 formed in the baffle section 60 and the first side 96 of the wedge section 90 facing the inlet channels 26 of the fuel cells 12.

Fuel flows into and through the inlet 66 toward the second end 64 of the baffle section 60. The fuel flows between the second end 64 of the baffle section 60 and the first end 92 of the wedge section 90. At the second end of the baffle section 60, the flow of the fuel is bifurcated, wherein a portion of the fuel is received in the flow channel 78 formed in the first side 74 of the wall 72 of the baffle section 60 and a portion of the fuel is received by the fluid flow path formed between the first side 96 of the wedge section 90 and the surface forming the inlet header 22 of the fuel cell assembly 10. The fuel flows from the flow channel 78 and the flow path formed between the first side 96 of the wedge section 90 and the surface forming the inlet header 22 into the inlet channels 26 of the fuel cells 12.

As fuel flows through the flow path formed between the first side 96 of the wedge section 90 and the surface forming the inlet header 22, the volume flow rate of the fuel within the flow path is reduced as fuel is received by the inlet channels 26 of the fuel cells 12. The reduced volume flow rate of fuel would normally cause an increase in a static fluid pressure and a reduction in a velocity of the fuel flowing in the flow path adjacent the second end 94 of the wedge section 90. However, the wedge section 90 causes a reduction in the volume of the flow path along a length thereof. The reduced volume of the flow path facilitates maintaining a selected fluid pressure and velocity of the fuel through the entire length of the inlet header 22 as the volume of the fuel is reduced due to the fuel flowing into the inlet channels 26 of the fuel cells 12. Further, introducing the fuel to the first sides 74, 96 of the wall 72 of the baffle section 60 and the wedge section 90, respectively, at the second end 64 of the baffle section 60, which is adjacent a mid-point of the inlet header 22, minimizes differences between lengths of the fluid flow path from the supply conduit 32 to the inlet channels 26 of the fuel cells 12.

By maintaining a selected fluid pressure and velocity of the fuel along the entire length of the inlet header 22, and by introducing the fuel into the inlet header 22 adjacent a mid-point along the length thereof, a time difference between the introduction of the fuel to the fuel cells 12 is minimized. Further, by minimizing a time difference between the introduction of the fuel to the fuel cells 12, localized reversed current in the fuel cells 12 and an associated electrode carbon corrosion is minimized, and an undesired emission of hydrogen through the exhaust header is minimized.

While certain representative embodiments and details have been shown for purposes of illustrating the invention, it will be apparent to those skilled in the art that various changes may be made without departing from the scope of the disclosure, which is further described in the following appended claims.

What is claimed is:

1. A fluid distribution insert for a fuel cell assembly comprising:
    a wedge section having a first end and a second end, the wedge section received within an inlet header of the fuel cell assembly to form a fluid flow path between a surface forming the inlet header and the wedge section, wherein the fluid flow path is adapted to receive a fluid therein and deliver the fluid to a plurality of fuel cells of the fuel cell assembly, wherein the wedge section minimizes a cross-sectional area of the fluid flow path adjacent the second end of the wedge section to maintain a substantially constant fluid velocity along a length of the fluid flow path;
    a baffle section having a first end and a second end, the second end of the baffle section spaced from the first end of the wedge section forming a fluid passageway therebetween; and
    a coupling member formed adjacent the first end of the baffle section and a wall member having a first side and a spaced apart second side extending outwardly from the coupling member and terminating at the second end of the baffle section.

2. The fluid distribution insert according to claim 1, wherein the second end of the baffle section is coupled to the first end of the wedge section.

3. The fluid distribution insert according to claim 1, wherein a sealing member is disposed on the coupling member of the baffle section, 4. The fluid distribution insert according to claim 3, wherein the sealing member is an O-ring.

5. The fluid distribution insert according to claim 1, wherein a flow channel is formed in the first side of the wall of the baffle section to deliver the fluid to the fuel cells.

6. The fluid distribution insert according to claim 1, wherein a protuberance extends outwardly from the second side of the wall of the baffle section, the protuberance received in an opening formed in the first end of the wedge section to couple together the wedge section and the baffle section.

7. A fluid distribution insert for a fuel cell assembly comprising:
- a wedge section having a first end and a second end, the wedge section received within an inlet header of the fuel cell assembly to form a fluid flow path between a surface forming the inlet header and the wedge section, wherein the fluid flow path is adapted to receive a fluid therein and deliver the fluid to a plurality of fuel cells of the fuel cell assembly; and
- a baffle section having a first end and a second end, the baffle section received within the inlet header of the fuel cell assembly, wherein the second end of the baffle section and the first end of the wedge section cooperate to form a fluid passageway therebetween, wherein the wedge section minimizes a cross-sectional area of the fluid flow path adjacent the second end of the wedge section to maintain a substantially constant fluid velocity along a length of the inlet header and
- a coupling member formed adjacent the first end of the baffle section and a wall member having a first side and a spaced apart second side extending outwardly from the coupling member and terminating at the second end of the baffle section.

8. The fluid distribution insert according to claim 7, wherein the second end of the baffle section is coupled to the first end of the wedge section.

9. The fluid distribution insert according to claim 7, wherein a sealing member is disposed on the coupling member of the baffle section.

10. The fluid distribution insert according to claim 7, wherein a flow channel is formed in the first side of the wall of the baffle section, wherein the fluid channel is adapted to receive a fluid therein and deliver the fluid to at least one of the plurality of fuel cells of the fuel cell assembly.

11. The fluid distribution insert according to claim 7, wherein a protuberance extends outwardly from the second side of the wall of the baffle section, the protuberance received in an opening formed in the first end of the wedge section to couple together the wedge section and the baffle section.

12. A fuel cell assembly comprising:
- a first end plate and a spaced apart second end plate;
- a plurality of fuel cells disposed between the first end plate and the second end plate;
- an inlet header in fluid communication with the fuel cells for supplying a reactant gas to the fuel cells; and
- a fluid distribution insert received within the inlet header of the fuel cell assembly, the fluid distribution insert comprising:
  - a wedge section having a first end and a second end, the wedge section received within the inlet header of the fuel cell assembly to form a fluid flow path between a surface forming the inlet header and the wedge section, wherein the fluid flow path is adapted to receive a fluid therein and deliver the fluid to the plurality of fuel cells of the fuel cell assembly; and
  - a baffle section having a first end and a second end, the baffle section received within the inlet header of the fuel cell assembly, wherein the second end of the baffle section is spaced from the first end of the wedge section to form a fluid passageway therebetween, wherein the wedge section minimizes a cross-sectional area of the fluid flow path adjacent the second end of the wedge section to maintain a substantially constant fluid velocity along a length of the inlet header: and
  - a coupling member formed adjacent the first end of the baffle section and a wall member having a first side and a spaced apart second side extending outwardly from the coupling member and terminating at the second end of the baffle section.

13. The fuel cell assembly according to claim 12, wherein the second end of the baffle section is coupled to the first end of the wedge section.

14. The fuel cell assembly according to claim 12, wherein a sealing member is disposed on the coupling member of the baffle section.

15. The fuel cell assembly according to claim 12, wherein a flow channel is formed in the first side of the wall of the baffle section, wherein the fluid channel is adapted to receive a fluid therein and deliver the fluid to at least one of the plurality of fuel cells of the fuel cell assembly.

16. The fuel cell assembly according to claim 12, wherein a protuberance extends outwardly from the second side of the wall of the baffle section, the protuberance received in an opening formed in the first end of the wedge section to couple together the wedge section and the baffle section.

* * * * *